No. 770,275. Patented September 20, 1904.

UNITED STATES PATENT OFFICE.

HERMAN ENDEMANN, OF NEW YORK, N. Y.

ANTISEPTIC COMPOUND AND PROCESS OF MAKING SAME.

SPECIFICATION forming part of Letters Patent No. 770,275, dated September 20, 1904.

Application filed August 20, 1903. Serial No. 170,116. (Specimens.)

*To all whom it may concern:*

Be it known that I, HERMAN ENDEMANN, a citizen of the United States, residing in the borough of Brooklyn, county of Kings, city and State of New York, have invented an Improved Antiseptic Composition and Process of Producing the Same, of which the following is a specification.

My invention relates to a new composition which I have found useful as an antiseptic to prevent lactic fermentation and elsewhere in the industries and which can safely be used with food or as a medicament in the human system.

Broadly considered, my antiseptic composition is produced by the oxidation of rosin by means of permanganic acid.

In order to produce my new antiseptic composition, I proceed as follows: Take about one hundred parts, by weight, of rosin and convert the same into rosin size by means of caustic soda. The rosin size is then dissolved in water. Then take about one hundred and fifty parts, by weight, of permanganate of potash and dissolve it in about two thousand parts of water. Sulfuric acid or an equivalent acid is then added to take up the potash and liberate the permanganic acid. The rosin-size solution and the permanganic solution are then thoroughly cooled and mixed. I prefer to cool them by adding crushed ice or by analogous means, so that the solutions after mixing are kept for at least one hour at a temperature of 0° centigrade. The permanganic acid causes the rosin to be precipitated in a very finely divided state, and this precipitate is therefore on account of its minute subdivision thoroughly exposed to the action of the permanganic acid, so as to be oxidized thereby uniformly and rapidly. The mixture at first is quite thick; but as the oxidation of the rosin proceeds gradually it thins down. After all the permanganate has been decomposed (which fact can be ascertained by the disappearance of the characteristic reddish or purple color of the solution) soda is added until an alkaline reaction results, and the mixture is then boiled. The soda combines with the oxidized rosin and forms a solution of sodium salts of the ingredients contained in the new composition of matter. The black peroxid of manganese which is precipitated is filtered off and the clear solution evaporated to a small bulk. Addition of an acid precipitates the new composition as a yellowish-brown powder. This powder is collected on a filter, washed, and dried. The aqueous solutions may be treated for the recovery of those portions of the composition still held in solution. The quantity thus remaining in the first water of precipitation is by no means small, since other products of oxidation of rosin tend to increase the solubility beyond that in pure water.

It will be seen that my improved antiseptic composition is a mixture of acids. It possesses, however, no acid taste. It is amorphous and has no stable melting-point, for the reason that the preponderance of one or the other constituent may cause the melting-point to be higher or lower. In any event, however, the melting-point is above 100° centigrade and lies generally between 110° and 125° centigrade. The composition has a bitter taste. Heated with boiling water it dissolves, but on cooling most of the dissolved substance separates, leaving less than one per cent. in solution. The composition melts in boiling water if added in proportion greater than its solubility. It is completely and easily soluble in alcohol, less easily in ether, and only partially in benzene and chloroform.

The composition has valuable properties as an antiseptic and can be used externally as a salve or ointment. It has also been taken internally in doses of about .1 gram to prevent lactic fermentation with excellent results and has generally been found useful wherever it is desirable to produce such result in the industries.

The proportions of rosin and permanganate may be varied. Taking less permanganate will be the cause of leaving in the product some unchanged rosin. Taking more permanganate produces in part a higher oxidation of the rosin without interfering with the reaction described. At the same time the yield is decreased.

I claim as my invention and desire to secure by Letters Patent—

1. The herein-described method of producing an antiseptic composition of matter which consists in treating rosin with caustic alkali to convert it into rosin size, and subjecting said rosin size to the action of permanganic acid in about the proportions described.

2. The method herein described of producing an oxidized-rosin composition by subjecting rosin to the action of permanganic acid in about the proportions described.

3. The herein-described new composition of matter, the same being a product of oxidation of rosin, soluble in hot water and in alcohol, less easily soluble in ether, partially soluble in benzene and chloroform, having a bitter taste and a melting-point approximately between 105° and 125° centigrade.

In testimony whereof I have signed my name to this specification in the presence of two subscribing witnesses.

HERMAN ENDEMANN.

Witnesses:
 EUGENE EBLE,
 JOHN W. PAISLEY.